(12) United States Patent
Nishii et al.

(10) Patent No.: US 6,280,700 B1
(45) Date of Patent: Aug. 28, 2001

(54) FILM OF TITANIUM DIOXIDE CONTAINING SILICON DIOXIDE AND A METHOD OF FORMING THE SAME

(75) Inventors: Junji Nishii; Adilson Oliveira da Silva; Derek A. H. Cunningham; Takahiro Inoue, all of Ikeda (JP)

(73) Assignee: Agency of Industrial Science & Technology, Tokyo (JP)

(*) Notice: Subject to any disclaimer, the term of this patent is extended or adjusted under 35 U.S.C. 154(b) by 0 days.

(21) Appl. No.: 09/327,472

(22) Filed: Jun. 8, 1999

(30) Foreign Application Priority Data

Jun. 24, 1998 (JP) .................................. 10-195083
Dec. 10, 1998 (JP) .................................. 10-375068

(51) Int. Cl.[7] ................. C01G 23/047; B32B 17/06; B32B 9/00; B32B 15/00; B05D 5/06
(52) U.S. Cl. ................. 423/610; 423/613; 428/428; 428/432; 427/167; 427/397.7
(58) Field of Search ................. 423/610, 612, 423/613; 204/192.1, 192.14, 192.23, 192.37; 65/60.5, 60.8, 60.53; 427/165, 166, 167, 168, 169, 397.7; 428/428, 432

(56) References Cited

U.S. PATENT DOCUMENTS

| | | | |
|---|---|---|---|
| 4,206,251 | * 6/1980 | Chen | 427/100 |
| 4,324,760 | * 4/1982 | Harris | 422/98 |
| 4,324,761 | * 4/1982 | Harris | 422/98 |
| 4,467,238 | * 8/1984 | Silverstein et al. | 313/25 |
| 4,524,091 | * 6/1985 | Blaauw et al. | 427/74 |
| 4,533,605 | * 8/1985 | Hoffman | 428/635 |
| 4,544,470 | * 10/1985 | Hetrick | 204/248 |
| 4,545,646 | * 10/1985 | Chern et al. | 350/162.2 |
| 4,615,772 | * 10/1986 | Hetrick | 204/1 T |
| 4,968,117 | * 11/1990 | Chern et al. | 350/162.24 |
| 5,055,169 | * 10/1991 | Hock, Jr. et al. | 204/192.31 |
| 5,200,277 | * 4/1993 | Nakayama et al. | 428/690 |
| 5,262,199 | * 11/1993 | Desu et al. | 427/255.1 |
| 5,352,485 | * 10/1994 | DeGuire et al. | 427/226 |
| 5,638,319 | * 6/1997 | Onishi et al. | 365/145 |
| 5,854,708 | * 12/1998 | Komatsu et al. | 359/512 |
| 5,882,946 | * 3/1999 | Otani | 437/60 |
| 5,919,726 | * 7/1999 | Hatano et al. | 502/227 |
| 6,045,903 | * 4/2000 | Seino et al. | 428/331 |

FOREIGN PATENT DOCUMENTS 52-063240 * 5/1977 (JP) .

* cited by examiner

Primary Examiner—Steven P. Griffin
Assistant Examiner—Cam N. Nguyen
(74) Attorney, Agent, or Firm—Arent, Fox, Kintner, Plotkin & Kahn, PLLC

(57) ABSTRACT

A film containing $TiO_2$ and $SiO_2$. It is formed by depositing $TiO_2$ and $SiO_2$ onto a substrate by sputtering method, or depositing their vapors thereon. The film is heat treated at a temperature of 200–1200° C. to form a film of anatase type $TiO_2$ containing $SiO_2$.

2 Claims, 1 Drawing Sheet

FILM OF TITANIUM DIOXIDE CONTAINING SILICON DIOXIDE AND A METHOD OF FORMING THE SAME

BACKGROUND OF THE INVENTION

1. Field of the Invention

This invention relates to a $TiO_2$—$SiO_2$ film (a film of titanium dioxide containing silicon dioxide) giving a film of anatase by heat treatment, and a method of forming the same.

2. Description of the Prior Art

Titanium dioxide ($TiO_2$) is known as a substance which can be used repeatedly as a catalyst having a high activity in environmental cleaning, for example, for decomposing the exhaust gases of automobiles and the nicotine of tobacco.

$TiO_2$ usually occurs in crystal form, and is classified by its structure into three types: rutile, brookite and anatase. It is easy to obtain rutile or brookite type $TiO_2$ by heat treating a film of amorphous $TiO_2$ at a temperature of 816° C. to 1040° C., but neither rutile nor brookite type $TiO_2$ has a very high catalytic power. Anatase type $TiO_2$ has a high catalytic activity, but is expensive, since it is mainly prepared by the hydrolysis of an organic titanium compound at a low temperature.

When $TiO_2$ is used as a catalyst, it is necessary to form it into a film, or fine particles to provide a large surface for the donation and acceptance of electrons, and it is necessary to heat treat such a film to ensure its adhesion to a substrate. Anatase type $TiO_2$ obtained by hydrolysis at a low temperature, however, is stable only at a temperature lower than 816° C., and easily changes to rutile type if heated at or above 816° C.

SUMMARY OF THE INVENTION

It is an object of this invention to provide a film which can easily form by heat treatment anatase type $TiO_2$ which is stable even at a high temperature.

It is another object of this invention to provide a method of forming such a film.

It is still another object of this invention to provide a method of forming anatase type $TiO_2$.

As a result of our research work done for attaining the above objects, we, the inventors of this invention, have unexpectedly found that anatase type $TiO_2$ is precipitated if a film of $TiO_2$ containing $SiO_2$ is formed by depositing $TiO_2$ and $SiO_2$ simultaneously by sputtering method, and is heat treated. We have also found that it is stable even at or above the temperature of 816° C. at which the transformation of anatase to rutile normally occurs.

According to this invention, therefore, there is provided a film comprising $TiO_2$ and $SiO_2$.

According to another aspect of this invention, there is provided a method of forming a film containing $TiO_2$ and $SiO_2$ which comprises employing a target containing $TiO_2$ and $SiO_2$, and depositing them simultaneously onto a substrate by sputtering method.

According to still another aspect of this invention, there is provided a method of forming a film containing $TiO_2$ and $SiO_2$ which comprises employing a source containing $TiO_2$ and $SiO_2$, and heating them simultaneously to effect vapor deposition on a substrate.

According to a further aspect of this invention, there is provided a method of forming a film of anatase type $TiO_2$ containing $SiO_2$ which comprises heat treating a film containing $TiO_2$ and $SiO_2$ at a temperature of 200° C. to 1200° C.

A film containing $TiO_2$ and $SiO_2$, or a $TiO_2$—$SiO_2$ film comprises a mixture of $TiO_2$ and $SiO_2$ in molecular form.

DESCRIPTION OF THE PREFERRED EMBODIMENTS

Figure 1:
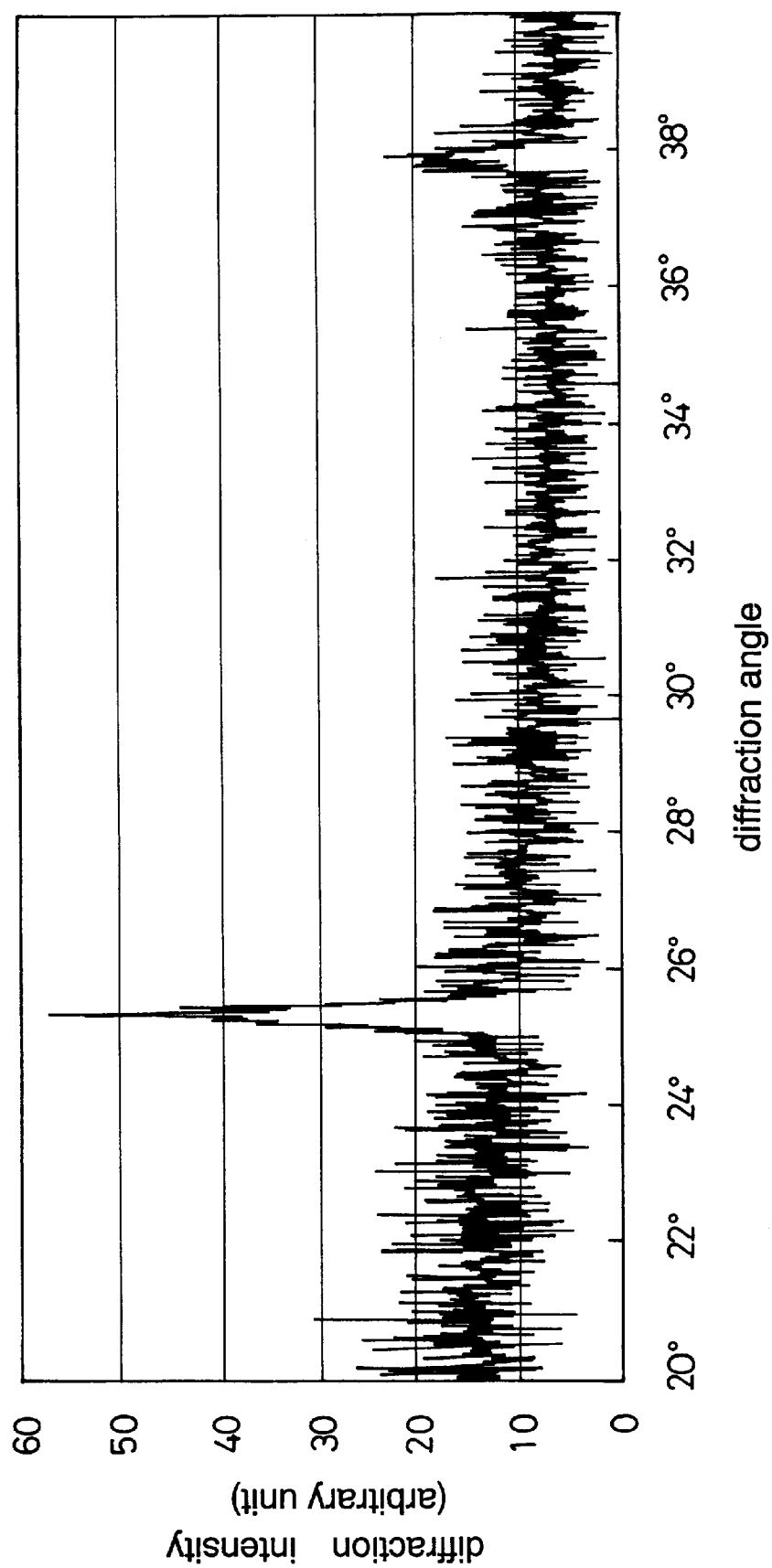
FIG. 1 is a diagram showing the X-ray diffraction patterns of a $TiO_2$—$SiO_2$ film as obtained in Example 1, and heat treated, as will be described later.

The film of this invention contains not only $TiO_2$, but also $SiO_2$. Its $TiO_2$ is amorphous. The film preferably has a thickness of, say, 100 to 10,000 Å, though its adequate thickness may depend on its intended use.

The proportion of $SiO_2$ in the film is preferably 5 to 75 mol %, and more preferably 15 to 60 mol %, though any other proportion may be acceptable if the heat treatment of the film at a temperature of, say, 200° C. to 1200° C. gives a product consisting mainly of anatase type $TiO_2$. No proportion of $SiO_2$ below 5 mol % is, however, desirable, since the heat treatment of the film is likely to form rutile type $TiO_2$ which is stable at a high temperature. No proportion above 75 mol % is desirable, either, since anatase type $TiO_2$ is formed only in a very small amount.

The $TiO_2$—$SiO_2$ film of this invention may be formed by employing a target containing $TiO_2$ and $SiO_2$, and depositing them simultaneously onto a substrate by sputtering method. Radio-frequency sputtering is preferred. Radio-frequency sputtering may, for example, be carried out by applying electromagnetic radiation having a frequency of 13.56 MHz onto the $TiO_2$ and $SiO_2$ target. The target preferably contains, say, 1 to 65 mol % of $SiO_2$, though its proper proportion may depend on the proportion of $SiO_2$ which the film to be formed is desired to contain. The proportion of $SiO_2$ in the target may be smaller than that which the film is desired to contain.

The $TiO_2$—$SiO_2$ film of this invention may alternatively be formed by employing a source containing $TiO_2$ and $SiO_2$, and heating them simultaneously to effect vapor deposition on a substrate. This is a vacuum vapor deposition process.

A mixture of argon and oxygen is preferably employed as a gas atmosphere in which the film is formed by such radio-frequency sputtering, or vapor deposition. The mixture preferably contains 5 to 80% by volume of oxygen. No oxygen proportion below 5% by volume is desirable, since the target becomes brown, while no oxygen proportion above 80% by volume is desirable, since sputtering, or vapor deposition is possible only with a low efficiency. Thus, it is recommended that a gas atmosphere containing 20 to 95% by volume of argon and 5 to 80% by volume of oxygen be employed for sputtering, or vapor deposition. The gas is preferably supplied at a flow rate of, say, 1 to 10 cc/min.

The substrate may be of any material that is usually employed as a substrate to form a $TiO_2$ film thereon, for example, silica glass. The reaction conditions depend on the reactor employed, but may, for example, include a voltage of, say, 10 to 300 V, a pressure of, say, $10^{-3}$ to $10^{-1}$ torr and a temperature ranging, say, from room temperature to 700° C.

It is easy to form anatase type $TiO_2$ by heat treating the $TiO_2$—$SiO_2$ film of this invention at a temperature allowing the selective precipitation of anatase. This temperature is, for example, from 200° C. to 1200° C., and preferably from 300° C. to 1100° C. The film is not crystallized at any temperature below 200° C. while its heating at a temperature above 1200° C. is likely to result undesirably in its separation from the substrate, or the precipitation of rutile. The precipitation means the formation of one solid phase from another. The film may be heated in the air, or in, for example, an oxygen atmosphere. The heating time depends on the heating temperature, the composition of the film, etc., but is usually, say, from 10 to 150 minutes.

The anatase type $TiO_2$ as thus obtained remains stable as anatase even at or above the temperature of 816° C. at which the conventional anatase type $TiO_2$ changes into rutile. It is useful as an excellent catalyst for cleaning the environment by, for example, decomposing the exhaust gases of automobiles containing NOx and the products of incomplete combustion of hydrocarbons, and the nicotine of tobacco.

The features and advantages of this invention will now be stated more clearly based on several examples embodying it, as well as comparative and test examples.

EXAMPLE 1

A target composed of 80 mol % of $TiO_2$ and 20 mol % of $SiO_2$ was placed in a radio-frequency sputtering apparatus, while a substrate of silica glass was mounted opposite the target at a distance of 40 mm therefrom. A mixed atmosphere gas consisting of 50% by volume of argon and 50% by volume of oxygen was supplied at a flow rate of 4 cc/min. into the sputtering chamber having a pressure of $10^{-2}$ torr, and sputtering was effected to deposit a $TiO_2$—$SiO_2$ film having a thickness of 2000 Å on the substrate, while the substrate was cooled by water having a temperature of 20° C.

The analysis of the film by X-ray photoelectron spectroscopy revealed that it was composed of 60 mol % of $TiO_2$ and 40 mol % of $SiO_2$. Its X-ray diffraction analysis did not reveal any diffraction peak attributable to anatase.

Then, the film was heat treated at a temperature of 980° C. for an hour in the air, and subjected again to X-ray diffraction analysis. There were obtained diffraction patterns including peaks attributable to anatase type $TiO_2$, as typically shown in FIG. 1. More specifically, FIG. 1 shows a peak having a diffraction intensity (arbitrary unit) of nearly 60 in the vicinity of a diffraction angle of 25.50 and a peak having a diffraction intensity (arbitrary unit) of about 23 in the vicinity of a diffraction angle of 37.8°.

EXAMPLES 2 TO 7

A $TiO_2$—$SiO_2$ film having a thickness of 2000 Å was formed in each of Examples 2 to 7 by using the gas atmosphere and target as shown in Table 1 and otherwise repeating Example 1. Its composition as found by X-ray photoelectron spectroscopy is also shown in Table 1. None of the films according to these Examples gave any X-ray diffraction peak attributable to anatase, but after their heat treatment given at the temperatures shown in Table 1 and otherwise by repeating Example 1, all the films revealed X-ray diffraction peaks attributable to anatase.

TABLE 1

Film forming conditions and results of analysis

| Example | Target composition (mol %) | Sputtering gas atmosphere (vol. %) | Film composition (mol %) | Heat treatment temp. (° C.) | Precipitate |
|---|---|---|---|---|---|
| 1 | 80$TiO_2$-20$SiO_2$ | 50Ar-50 $O_2$ | 60$TiO_2$-40$SiO_2$ | 980 | anatase |
| 2 | 95$TiO_2$-5$SiO_2$ | 50Ar-50 $O_2$ | 90$TiO_2$-10$SiO_2$ | 980 | anatase |
| 3 | 45$TiO_2$-55$SiO_2$ | 50Ar-50 $O_2$ | 30$TiO_2$-70$SiO_2$ | 980 | anatase |
| 4 | 80$TiO_2$-20$SiO_2$ | 90Ar-10 $O_2$ | 60$TiO_2$-40$SiO_2$ | 980 | anatase |
| 5 | 80$TiO_2$-20$SiO_2$ | 30Ar-70 $O_2$ | 60$TiO_2$-40$SiO_2$ | 980 | anatase |
| 6 | 80$TiO_2$-20$SiO_2$ | 50Ar-50 $O_2$ | 60$TiO_2$-40$SiO_2$ | 350 | anatase |
| 7 | 80$TiO_2$-20$SiO_2$ | 50Ar-50 $O_2$ | 60$TiO_2$-40$SiO_2$ | 1200 | anatase |

COMPARATIVE EXAMPLE 1

A film consisting 100% of $TiO_2$ was formed by using a target consisting 100% of $TiO_2$ and otherwise repeating the sputtering conditions of Example 1. After its heat treatment at a temperature of 400° C. or above for an hour in the air, the film gave an X-ray diffraction peak attributable to rutile type $TiO_2$, while it did not give any diffraction peak attributable to anatase after its treatment at a temperature below 400° C.

TEST EXAMPLE 1

The products of all of Examples 1 to 7 were heated at 850° C. for 30 minutes, and subjected to X-ray diffraction analysis. All of the products gave diffraction peaks attributable to anatase, and none of them found to have changed to rutile.

The $TiO_2$—$SiO_2$ film of this invention facilitates the formation of anatase type $TiO_2$, since it forms anatase type $TiO_2$ by heat treatment in a broad range of temperatures including that at which rutile or brookite type $TiO_2$ is normally formed. The anatase type $TiO_2$ obtained by the method of this invention is easy to form into an adequate shape as a catalyst even at a high temperature, since it remains stable even at or above the temperature of 816° C. at which the conventional anatase changes into rutile.

What is claimed is:

1. A method of producing an anatase $TiO_2$ film containing $SiO_2$, which method comprises the steps of:

(1) forming a film comprising $TiO_2$ and $SiO_2$ by simultaneously depositing $TiO_2$ and $SiO_2$ on a silica glass substrate by sputtering, and then (2) subjecting the formed film to a heat treatment at a temperature of 300 to 1200° C.

2. A method according to claim 1, wherein the sputtering in step (1) is carried out in a mixed gas atmosphere comprising 20 to 95 vol % of argon gas and 5 to 80% of oxygen gas.

* * * * *